United States Patent [19]

Ueno et al.

[11] Patent Number: 6,057,020

[45] Date of Patent: May 2, 2000

[54] OPTICAL RECORDING MEDIUM AND RECORDING AND/OR REPRODUCTION METHOD USING THE SAME

[75] Inventors: Yasunobu Ueno; Tsutomu Sato, both of Kanagawa; Tatsuya Tomura, Tokyo; Noboru Sasa; Yasuhiro Higashi, both of Kanagawa, all of Japan

[73] Assignee: Ricoh Company, Ltd., Tokyo, Japan

[21] Appl. No.: 09/066,735

[22] Filed: Apr. 27, 1998

[30] Foreign Application Priority Data

Apr. 28, 1997 [JP] Japan ..................................... 9-111140

[51] Int. Cl.⁷ ....................................................... B32B 3/00
[52] U.S. Cl. ....................... 428/64.1; 428/64.4; 428/64.8; 428/913; 430/270.14; 430/270.16; 430/495.1; 430/945; 369/283; 369/288
[58] Field of Search .................................. 428/64.1, 64.2, 428/64.4, 64.8, 913; 430/270.14, 270.16, 270.18, 495.1, 945; 369/283, 288

[56] References Cited

U.S. PATENT DOCUMENTS

| | | |
|---|---|---|
| 4,714,667 | 12/1987 | Sato et al. . |
| 4,735,839 | 4/1988 | Sato et al. . |
| 4,737,444 | 4/1988 | Satoh et al. . |
| 4,758,499 | 7/1988 | Abe et al. . |
| 4,767,693 | 8/1988 | Oba et al. . |
| 4,891,305 | 1/1990 | Oba et al. . |
| 5,002,812 | 3/1991 | Umehara et al. . |
| 5,028,467 | 7/1991 | Maruyama et al. . |
| 5,085,909 | 2/1992 | Satoh et al. . |
| 5,149,819 | 9/1992 | Satoh et al. . |
| 5,256,794 | 10/1993 | Satoh et al. . |
| 5,260,165 | 11/1993 | Satou et al. . |
| 5,510,229 | 4/1996 | Satoh et al. . |

FOREIGN PATENT DOCUMENTS

| | | |
|---|---|---|
| 0 188 001 | 7/1986 | European Pat. Off. . |
| 0 483 382 | 5/1992 | European Pat. Off. . |
| 0 755 052 | 1/1997 | European Pat. Off. . |
| 0 849 727 | 6/1998 | European Pat. Off. . |

*Primary Examiner*—Elizabeth Evans
*Attorney, Agent, or Firm*—Oblon, Spivak, McClelland, Maier & Neustadt, P.C.

[57] ABSTRACT

An optical recording medium has a substrate and a recording layer which is formed on the substrate and contains an azo metal chelate compound including an azo moiety of formula (I) and a bivalent or trivalent metal;

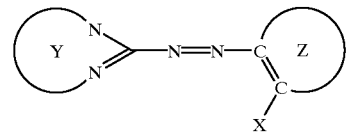

wherein X is OH group, CooH group or $CONH_2$ group; Y is a residual group forming a heterocyclic ring in combination with nitrogen atoms bonded thereto; and Z is a residual group forming an aromatic ring in combination with carbon atoms bonded thereto. In addition, there is provided a method of recording information and reproducing the information using the above-mentioned optical recording medium.

25 Claims, 1 Drawing Sheet

OPTICAL RECORDING MEDIUM AND RECORDING AND/OR REPRODUCTION METHOD USING THE SAME

BACKGROUND OF THE INVENTION

1. Field of the Invention

The present invention relates to an optical recording medium comprising a substrate and a recording layer formed thereon comprising a specific azo metal chelate compound, and a recording and/or reproducing method using the above-mentioned optical recording medium.

2. Discussion of Background

The conventional write once read many recording medium employs as a recording material a cyanine dye (disclosed in Japanese Laid-Open Patent Applications 57-82093, 58-56892, 58-112790, 58-114989, 59-85791, 60-83236, 60-89842, and 61-25886); and a phthalocyanine dye (disclosed in Japanese Laid-Open Patent Applications 61-150243, 61-177287, 61-154888, 61-24609, 62-39286, 63-37991 and 63-39888). In addition, for the recording medium as the compact disk of a write once read many type, there have been proposed the combination of a metal reflection layer and a cyanine dye (disclosed in Japanese Laid-Open Patent Applications 1-159842, 2-42652, 2-13656 and 2-168446); the combination of a metal reflection layer and a phthalocyanine dye (disclosed in Japanese Laid-Open Patent Applications 1-176585, 3-215466, 4-113886, 4-226390, 5-1272, 5-171052, 5-116456, 5-96860 and 5-139044) and the combination of a metal reflection layer and an azo metal chelate dye (disclosed in Japanese Laid-Open Patent Applications 4-46186, 4-141489, 4-361088 and 5-279580).

The wavelength of a laser used for a currently employed optical disk system of a write once read many type, which may be referred to as WORM disk system is in the range of 770 nm to 790 nm, and a recording medium for this disk system is constructed in such a manner that recording and reproduction can be performed in the above-mentioned wavelength range.

Sooner or later, it will become inevitable that the capacity of such a recording medium has to be significantly increased in accordance with the amount of information to be handled. It will also become inevitable that the wavelength of the laser beam used for the recording and reproduction has to be shortened.

However, no recording medium has been developed that shows excellent light resistance and preservation stability and can be subjected to the recording and reproducing operation by the optical pick-up using a laser beam of 700 nm or less.

Currently employed CD-R (CD-Recordable) systems are also constructed in such a manner that recording and reproduction can be performed by a laser beam with a wavelength in the range of 770 nm to 790 nm.

As in the case of the above-mentioned WORM disk system, it will also become inevitable that the capacity of the recording medium for use in the CD-R system has to be significantly increased in accordance with the amount of information to be handled, and that the wavelength of the laser beam used for the recording and reproduction also has to be shortened.

In CDs and CD-ROMs which are currently employed, Al is coated on the concave and convex portions of the substrate therefor and the wavelength-dependence of the reflectivity of Al is so small that even if the wavelength of the laser beam used therefor is shortened in the future, reproduction of information recorded in such CDs and CD-ROMs is possible.

However, the recording layer of the currently employed CD-R, which uses therein a dye with a maximum absorption wavelength in the range of 680 nm to 750 nm, is designed so as to exhibit a maximum reflectance when a laser beam with a wavelength of 770 nm to 790 nm is applied thereto, with the optical characteristics and constants and the thickness and structure of the recording layer taken into consideration.

Therefore, when a laser beam with a wavelength of 700 nm or less is applied thereto, the reflectance obtained from the recording layer is extremely small, so that the currently employed CD-R cannot cope with the shortening of the wavelength of the employed laser beam in the future. As a result, it will be highly possible that the information recorded by the currently employed CD-R system cannot be reproduced by such a future system.

SUMMARY OF THE INVENTION

It is therefore a first object of the present invention to provide an optical recording medium which has high light resistance and excellent preservation stability, and can be used in a high density optical disk system which uses a semiconductor laser beam with a shorter wavelength than that of a laser beam employed in the above-mentioned conventional optical recording disk systems.

A second object of the present invention is to provide an optical recording medium capable of recording information therein by the current CD-R disk system, and reproducing the above-mentioned information by the high density optical disk system for the next generation.

The above-mentioned objects of the present invention can be achieved by an optical recording medium comprising a substrate and a recording layer formed thereon comprising an azo metal chelate compound which comprises an azo moiety of formula (I) and a bivalent or trivalent metal:

(I)

wherein X is OH group, COOH group or $CONH_2$ group; Y is a residual group forming a heterocyclic ring in combination with nitrogen atoms bonded thereto; and Z is a residual group forming an aromatic ring in combination with carbon atoms bonded thereto.

A third object of the present invention is to provide a recording and/or reproduction method using the above-mentioned optical recording medium.

The above-mentioned third object of the present invention can be achieved by a method of reproducing recorded information, which comprises the step of applying a laser beam in a wavelength range of 620 to 690 nm to the above-mentioned optical recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The recording layer of the optical recording medium according to the present invention comprises an azo metal chelate compound having an azo moiety with such a particular structure as shown in formula (I), so that the optical recording medium of the present invention is applicable to the high-density optical disk system using a semiconductor laser beam of 700 nm or less. Further, in the optical recording medium of the present invention, when the above-mentioned azo metal chelate compound is used in combination with an organic dyestuff which is employed as the recording material in the conventional CD-R, information recorded in the optical recording medium by the application of a laser beam of 770 to 790 nm can be reproduced using the high-density optical disk system using a semiconductor laser beam of 700 nm or less.

The azo metal chelate compound for use in the present invention comprises an azo moiety of formula (I) and a bivalent or trivalent metal.

[Formula (I)]

(I)

wherein X is OH group, COOH group or CONH$_2$ group; Y is a residual group forming a heterocyclic ring in combination with nitrogen atoms bonded thereto; and Z is a residual group forming an aromatic ring in combination with carbon atoms bonded thereto.

Specific examples of the bivalent or trivalent metal for use in the above-mentioned azo metal chelate compound include atoms belonging to the group III, such as Sc and Y; atoms belonging to the group IV, such as Ti, Zr and Hf; atoms belonging to the group V, such as V, Nb and Ta; atoms belonging to the group VI, such as Cr, Mo and W; atoms belonging to the group VII, such as Mn, Tc and Re; atoms belonging to the group VIII, such as Fe, Co, Ni, Ru, Rh, Pd, Os, Ir and Pt; atoms belonging to the group IX, such as Cu, Ag and Au; and atoms belonging to the group X, such as Zn, Cd and Hg.

The azo moiety constituting the azo metal chelate compound in the optical recording medium of the present invention has preferable structures represented by the following formulas (II) and (III):

[(Formula (II)]

(II)

wherein $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; X is OH group, COOH group or CONH$_2$ group; and Z is a residual group forming an aromatic ring in combination with carbon atoms bonded thereto. [Formula (III)]

(III)

wherein $R^4$ is a hydrogen atom or an alkyl group; X is OH group, COOH group or CONH$_2$ group; and Z is a residual group forming an aromatic ring in combination with carbon atoms bonded thereto.

A heterocyclic ring including the residual group (Y) in formula (II) is an imidazole ring, and that in formula (III) is a tetrazole ring.

In particular, the azo moieties of the following formulas (IV) and (V) are more preferable in the present invention:
[Formula (IV)]

(IV)

wherein $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; $R^5$ to $R^8$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or CONH$_2$ group.

[Formula (V)]

wherein $R^4$ is a hydrogen atom or an alkyl group; $R^9$ to $R^{12}$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or $CONH_2$ group.

In the formula (II) or (IV), $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and 3 may form a ring together. Further in the formula (IV), $R^5$ to $R^8$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group.

Examples of the alkyl group represented by $R^1$ in the formulas (II) and (IV) include straight-chain alkyl groups such as methyl group, ethyl group, propyl group, butyl group, pentyl group, and hexyl group; and branched alkyl groups such as isobutyl group, isoamyl group, and 2-methylbutyl group.

Examples of the alkyl group represented by $R^2$ and $R^3$ in formulas (II) and (IV) and $R^5$ to $R^8$ in formula (IV) include straight-chain alkyl groups such as methyl group, ethyl group, n-propyl group, n-butyl group, n-pentyl group, n-hexyl group, n-heptyl group, n-octyl group, n-nonyl group, and n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group, and tert-octyl group; and cycloalkyl groups such as cyclohexyl group, 4-methylcyclohexyl group, 4-ethylcyclohexyl group, 4-tert-butylcyclohexyl group, 4-(2-ethylhexyl)cyclohexyl group, bornyl group, and isobornyl group (adamantane group).

The above-mentioned straight-chain alkyl groups and branched alkyl groups may have a substituent such as hydroxyl group or a halogen atom.

Further, the alkyl group may have as a substituent the above-mentioned alkyl group via oxygen atom, sulfur atom or nitrogen atom. Examples of the alkyl group having as a substituent an alkyl group via oxygen atom include methoxymethyl group, methoxyethyl group, ethoxymethyl group, ethoxyethyl group, butoxyethyl group, ethoxyethoxyethyl group, phenoxyethyl group, methoxypropyl group, and ethoxypropyl group. Examples of the alkyl group having as a substituent an alkyl group via sulfur atom include methylthioethyl group, ethylthioethyl group, ethylthiopropyl group, and phenylthioethyl group. Examples of the alkyl group having as a substituent an alkyl group via nitrogen atom include dimethylaminoethyl group, diethylaminoethyl group, and diethylaminopropyl group.

Examples of the aryl group represented by $R^2$ and $R^3$ in formulas (II) and (IV) and $R^5$ to $R^8$ in formula (IV) are phenyl group, ethylphenyl group, butylphenyl group, nonylphenyl group, naphthyl group, butylnaphthyl group and nonylnaphthyl group.

The above-mentioned aryl group may have a substituent such as hydroxyl group or a halogen atom.

Further, the aryl group may have as a substituent the above-mentioned alkyl group via oxygen atom, sulfur atom or nitrogen atom. Examples of the aryl group having as a substituent an alkyl group via oxygen atom include phenoxyethyl group, methoxyphenyl group, and butoxyphenyl group. Examples of the aryl group having as a substituent an alkyl group via sulfur atom include phenylthioethyl group, methylthioethyl group, and butylthioethyl group. Examples of the aryl group having as a substituent an alkyl group via nitrogen atom include dimethylaminophenyl group and dibutylaminophenyl group.

Examples of the alkenyl group represented by $R^2$ and $R^3$ in formulas (II) and (IV) and $R^5$ to $R^8$ in formula (IV) are ethylene group, propenyl group, butenyl group, hexenyl group, octenyl group, dodecenyl group, cyclohexenyl group, and butylhexenyl group. These alkenyl groups may have a substituent such as hydroxyl group or a halogen atom.

The alkylalkoxyl group represented by $R^5$ to $R^8$ in formula (IV) includes an alkyl group such as straight-chain alkyl groups, for example, methyl group, ethyl group, propyl group, butyl group, pentyl group, and hexyl group; and branched alkyl groups, for example, isobutyl group, isoamyl group, and 2-methylbutyi group.

The alkylamino group represented by $R^5$ to $R^8$ in formula (IV) can be expressed by $-NR^{14}R^{15}$, in which $R^{14}$ and $R^{15}$ are each independently a hydrogen atom or an alkyl group provided $R^{14}$ and $R^{15}$ are not hydrogen atom at the same time. Examples of the alkyl group represented by $R^{14}$ and $R^{15}$ include straight-chain alkyl groups such as methyl group, ethyl group, propyl group, butyl group, pentyl group, and hexyl group; and branched alkyl groups such as isobutyl group, isoamyl group, and 2-methylbutyl group.

In the above formulas (III) and (V), $R^4$ is a hydrogen or an alkyl group, and $R^9$ to $R^{12}$ in formula (V) are each independently a hydrogen atom, a substituted or unsubstituted alkyl group, a substituted or unsubstituted aryl group, a substituted or unsubstituted alkenyl group, a substituted or unsubstituted alkylalkoxyl group, a substituted or unsubstituted alkylamino group, a halogen atom, nitro group, cyano group, hydroxyl group, amino group, or a methyl trifluoride group.

Examples of the alkyl group represented by $R^4$ in formulas (III) and (V) are straight-chain alkyl groups such as methyl group, ethyl group, propyl group, butyl group, pentyl group, and hexyl group; and branched alkyl groups such as isobutyl group, isoamyl group, and 2-methylbutyl group.

Specific examples of the above-mentioned substituted or unsubstituted alkyl group, substituted or unsubstituted aryl group, substituted or unsubstituted alkenyl group, substituted or unsubstituted alkylalkoxyl group, and substituted or unsubstituted alkylamino group represented by $R^9$ to $R^{12}$ in formula (V) are the same as those stated in the description of $R^5$ to $R^8$.

Figure 1A:
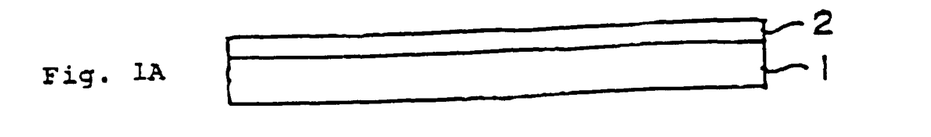
FIGS. 1A to 1D are schematic cross-sectional views which show embodiments of the optical recording medium of write once read many type according to the present invention.
Figure 1B:
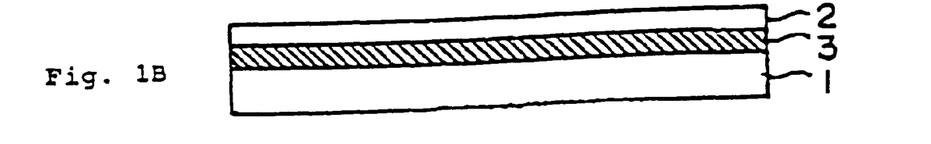
Figure 1C:
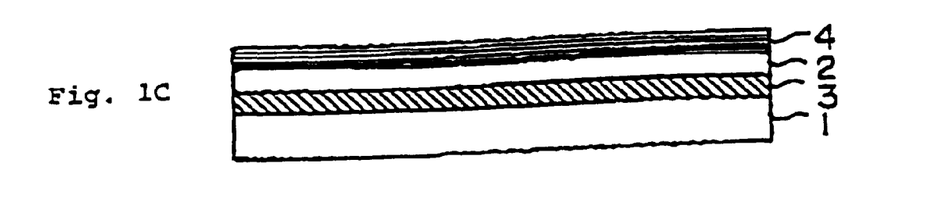
Figure 1D:
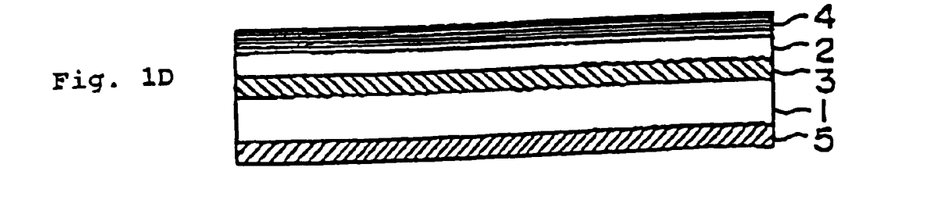

An optical recording medium of the present invention comprises a substrate 1 and a recording layer 2 formed thereon as shown in FIG. 1A. Further, an undercoat layer 3 may be interposed between the substrate 1 and the recording layer 2 as shown in FIG. 1B; a protective layer 4 may be overlaid on the recording layer 2 as shown in FIG. 1C; and a hard coat layer 5 may be provided on the back side of the substrate 1, opposite to the recording layer 2 with respect to the substrate 1, as shown in FIG. 1D.

In addition, the optical recording medium of the present invention can also be constructed by superimposing any two of the above-mentioned recording media shown in FIGS. 1A to 1D in such a manner that the recording layers of the two recording media are positioned inside so as to face each other with an air gap therebetween in a sealed air-sandwich structure, or by pasting the two recording media in the above-mentioned posture. Such structures are applied to the optical disk of a write once read many type.

Figure 2A:
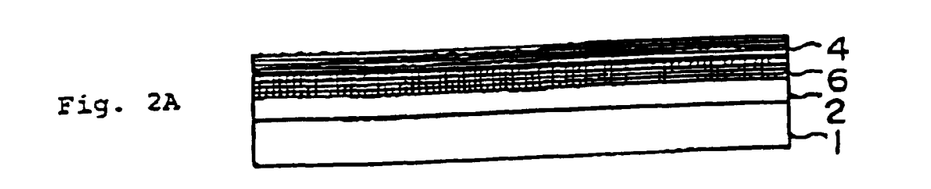
FIGS. 2A to 2C are schematic cross-sectional views which show embodiments of the optical recording medium, serving as a CD-R, according to the present invention.
Figure 2B:
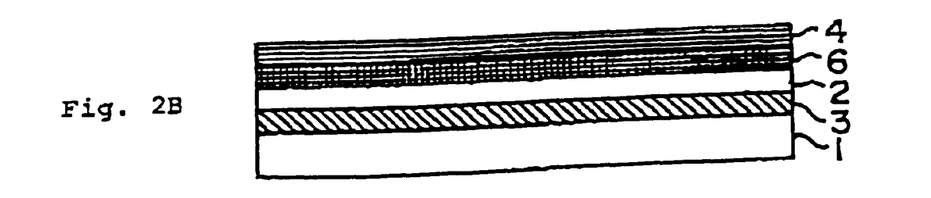
Figure 2C:
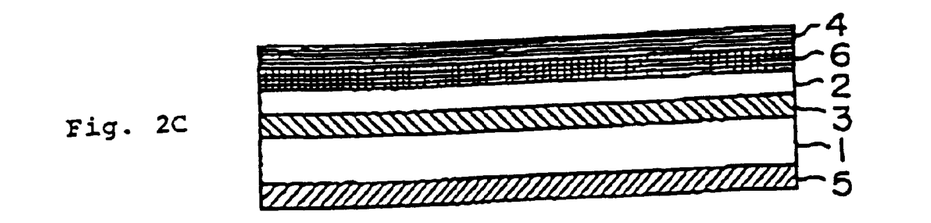

Furthermore, the optical recording medium with such a structure that car be used as the CD-R medium, for instance, as illustrated in FIGS. 2A, 2B or 2C, is usable. In those embodiments, a reflection layer 6 is interposed between the recording layer 2 and the protective layer 4.

Required properties or characteristics and materials for each of the above-mentioned layers of the optical recording medium of the present invention will now be explained.

Substrate

When recording and reproduction are carried out at the substrate side, it is required that the substrate be transparent to the laser beam employed for the recording and reproduction. However, such transparency is unnecessary when recording and reproduction are carried out at the recording layer side.

Examples of the material for the substrate are plastics such as polyester, acrylic-resin, polyamide, polycarbonate resin, polyolefin resin, phenolic resin, epoxy resin and polyimide; glass; ceramics; and metals. Guide grooves or guide pits for tracking may be formed on the surface of the substrate. Furthermore, preformats for address signals and the like may also be formed on the surface of the substrate.

Recording Layer

Information is recorded in the recording layer by causing some optical changes in the recording layer when the recording layer is irradiated by laser beams. According to the present invention, it is required that at least one of the previously mentioned azo metal chelate compounds be contained in this recording layer. These azo metal chelate compounds can also be used in combination with other organic dyestuffs, metals or metal compounds in the form of a mixture or the form of overlaid layers, in order to improve the optical characteristics, recording sensitivity and signal characteristics of the recording layer.

Examples of the above-mentioned other organic dyestuffs are polymethine dyes, naphthalocyanine dyes, phthalocyanine dyes, squarylium dyes, croconium dyes, pyrylium dyes, naphthoquinone dyes, anthraquinone (indanthrene) dyes, xanthene dyes, triphenylmethane dyes, azulene dyes, tetrahydrocholine dyes, phenanthrene dyes, triphenothiazine dyes, and metal chelate compounds. One kind of organic dye selected from the above-mentioned group may be used together with the azo metal chelate compound for use in the present invention, or two or more organic dyes may be used in combination therewith.

Examples of the above-mentioned metals and metal compounds are In, Te, Bi, Se, Sb, Ge, Sn, Al, Be, $TeO_2$, SnO, As and Cd. These metals and metal compounds can be used in the form of a dispersed mixture or in the form of overlaid layers.

In the above-mentioned dyes, various materials, for example, polymers such as ionomer resin, polyamide resin, vinyl resin, natural polymers, silicone and liquid rubber, and a silane coupling agent may be dispersed.

Furthermore, in order to improve the characteristics of the recording layer, the above-mentioned dyes may also be employed in combination with other agents such as a stabilizer (for example, a transition metal complex), a dispersant, a fire retardant, a lubricant, an antistatic agent, a surfactant, and a plasticizer.

The recording layer can be formed by any of conventional methods such as deposition, sputtering, CVD and solution coating.

The coating method is carried cut by dissolving any of the above-mentioned compounds, dyes and other materials in an organic solvent to prepare a coating liquid, and coating the thus prepared coating liquid for the recording layer, for instance, on the substrate by a conventional coating method such as spray coating roller coating, dip coating, or spinner coating.

Specific examples of the organic solvent used in the preparation of the recording layer are alcohols such as methanol, ethanol and isopropanol; ketones such as acetone, methyl ethyl ketone and cyclohexanone; amides such as N,N-dimethylformamide and N,N-dimethyl-acetamide; sulfoxide such as dimethyl sulfoxide; ethers such as tetrahydrofuran, dioxane, diethyl ether and ethylene glycol monomethyl ether; esters such as methyl acetate and ethyl acetate; aliphatic halogenated hydrocarbons such as chloroform, methylene chloride, dichloroethane, carbon tetrachloride and trichloro-ethane; aromatic solvents such as benzene, xylene, monochlorobenzene and dichlorobenzene; Cellosolves such as methoxy ethanol and ethoxy ethanol; and hydrocarbons such as hexane, pentane, cyclohexane and methycyclohexane.

It is preferable that the recording layer for use in the optical recording medium of the present invention have a thickness in the range of 100 Å to 10 μm, more preferably in the range of 200 Å to 2000 Å.

Undercoat Layer

The undercoat layer 3 may be interposed between the substrate 1 and the recording layer 2, as illustrated in FIG. 1B, for the following purposes: (a) improving the adhesion strength between the substrate and the recording layer; (b) preventing the recording layer from being exposed to water and gases as a barrier layer; (c) improving the preservation stability of the recording layer; (d) increasing the reflectance of the recording layer; (e) protecting the substrate from the solvent employed; and (f) forming guide grooves, guide pits and preformats and the like.

To attain the above-mentioned purpose (a), a variety of polymeric materials such as ionomer resin, polyamide resin, vinyl resin, natural resins, natural polymeric materials, silicone and liquid rubber; and a silane coupling agent may be employed for preparation of the undercoat layer.

To attain the purposes (b) and (c), not only the above-mentioned polymeric materials, but also inorganic compounds such as SiO, MgF, $SiO_2$, TiO, ZnO, TiN and SiN, and metals such as Zn, Cu, Ni, Cr, Ge, Se, Au, Ag and Al and semimetals can be used.

To attain the purpose (d), a metal such as Al, Au or Ag may be used for the formation of the undercoat layer; or an organic thin film exhibiting metallic luster which comprises, for example, methine dye or xanthene dye, may be used as the undercoat layer.

To attain the purposes (e) and (f), an ultraviolet-curing resin, a thermosetting resin and a thermoplastic resin can be used for the formation of the undercoat layer.

It is preferable that the undercoat layer have a thickness in the range of 0.01 to 30 μm, more preferably in the range of 0.05 to 10 μm.

Reflection Layer

The reflection layer 6 for use in the optical recording medium as shown in FIG. 2A can be made of a metal or a semimetal which shows high reflectance and is insusceptible to corrosion.

Specific examples of the metal for the formation of the reflection layer are Au, Ag, Cr, Ni, Al, Fe and Sn. Of these metals, Au, Ag and Al are particularly preferable in the present invention in view of the reflectance and productivity. These petals can be used alone or in combination, or in the form of alloys.

The reflection layer can be formed by a conventional film formation method such as vacuum deposition or sputtering. It is preferable that the reflection layer have a thickness in the range of 50 to 5000 Å, more preferably in the range of 100 to 3000 Å.

Protective Layer and Hard Coat Layer

The protective layer 4, for example, as shown in FIGS. 1C or 2A, is provided on the recording layer 2 or the reflection layer 6 (a) to protect the recording layer 2 or the reflection layer 6 from damage, dust and soiling, (b) to improve the preservation stability of the recording layer 2 or the reflection layer 6, and (c) to improve the reflectance of the recording layer 2. The hard coat layer 5, for example, as shown in FIG. 1D or FIG. 2C, is provided on the back surface of the substrate 1, opposite to the recording layer 2 with respect to the substrate 1, in order to protect the back surface of the substrate 1 from damage, dust and soiling.

For these purposes, the same materials as employed for the undercoat layer 3 are usable for the formation of the protective layer 4 and the hard coat layer 5. For the preparation of the protective layer 4 and the hard coat layer 5, there can also be employed inorganic materials, for instance, SiO and $SiO_2$; and organic materials, for instance, heat-softening or heat-fusible resins such as polymethyl acrylate, polycarbonate, epoxy resin, polystyrene, polyester resin, vinyl resin, cellulose, aliphatic hydrocarbon resin, aromatic hydrocarbon resin, natural rubber, styrene—butadiene resin, chloroprene rubber, wax, alkyd resin, drying oil, and rosin, and ultraviolet-curing resins.

Of the above-mentioned resins, the ultraviolet-curing resin is most preferable for the protective layer 4 and also for the hard coat layer 5 in light of productivity of such layers.

It is preferable that the protective layer 4 and the hard coat layer 5 have a thickness in the range of 0.01 to 30 μm, more preferably in the range of 0.05 to 10 μm.

In the present invention, auxiliary agents such as a stabilizer, a dispersant, a fire retardant, a lubricant, an antistatic agent, a surfactant, and a plasticizer may be contained in the above-mentioned undercoat layer 3, protective layer 4 and hard coat layer 5 in the same manner as in the case of the recording layer 2.

As previously mentioned, according to the present invention, there can be provided an optical recording medium which has excellent light resistance and preservation stability and is capable of carrying out recording and reproducing operation by the application of a laser beam with a wavelength of 700 nm or less. Namely, there is provided a method of recording information in the optical recording medium of the present invention and/or reproducing the recorded information therefrom by applying a laser beam in a wavelength range of 620 to 690 nm to the recording medium because the recording layer of the optical recording medium of the present invention comprises the previously mentioned azo metal chelate compound of formula (I).

Further, when the recording layer comprises the above-mentioned azo metal chelate compound and a dye which exhibits a maximum absorption in the wavelength range of 680 to 750 nm, the recording medium thus obtained can be used as the CD-R medium in the current disk system. Namely, there is provided a method of recording information and/or reproducing the information, by applying a laser beam in a wavelength range of 770 to 830 nm to such an optical recording medium. In this case, the information recorded in the optical recording medium can also be reproduced using a high density optical disk system for the next generation, for example, employing a laser beam with a wavelength of 620 to 690 nm.

Further, when the azo metal chelate compound for use in the recording layer exhibits a maximum absorption in the wavelength range of 450 to 630 nm, the recording can be carried out with high-quality signal characteristics.

The azo moiety constituting the azo metal chelate compound for use in the recording layer has a preferable structure A with the previously mentioned formula (IV), or a preferable structure B with the previously mentioned formula (V). Specific examples of the azo metal chelate compound for use in the present invention are shown in TABLE 1, by referring to the structure A or B:

[Structure A with Formula (IV)]

[Structure B with Formula (V)]

TABLE 1

| Compound No. | Structure | $R^1$ | $R^2, R^3$ | $R^4$ | Structure: A: $R^5$–$R^8$<br>Structure B: $R^9$–$R^{12}$ | X | Metal |
|---|---|---|---|---|---|---|---|
| 1 | A | $CH_3$ | $R^2 = R^3 = H$ | | $R^6 = CF_3$  $R^5 = R^8 = H$<br>$R^7 = N(CH_2CH_3)_2$ | COOH | Ni |
| 2 | B | | | $CH_3$ | $R^{10} = CF_3$  $R^9 = R^{12} = H$<br>$R^{11} = N(CH_2CH_3)_2$ | COOH | Ni |
| 3 | A | $CH_3$ | $R^2 = R^3 = H$ | | $R^6 = CF_3$  $R^5 = R^8 = H$<br>$R^7 = N(CH_2CH_3)[(CH_2)_3CH_3]$ | COOH | Co |
| 4 | B | | | $CH_3$ | $R^{10} = CF_3$  $R^9 = R^{12} = H$<br>$R^{11} = N(CH_2CH_3)[(CH_2)_3CH_3]$ | COOH | Co |
| 5 | A | $CH_3$ | $R^2 = R^3 = H$ | | $R^6 = OCH_3$  $R^5 = R^8 = H$<br>$R^7 = N(CH_2CH_3)[(CH_2)_3CH_3]$ | COOH | Cu |
| 6 | B | | | $CH_3$ | $R^{10} = OCH_3$  $R^9 = R^{12} = H$<br>$R^{11} = N(CH_2CH_3)[(CH_2)_3CH_3]$ | COOH | Cu |
| 7 | A | $CH_2CH_3$ | $R^2 = R^3 = CN$ | | $R^6 = CF_3$  $R^5 = R^{12} = H$<br>$R^7 = N(CH_2CH_3)_2$ | OH | Zn |
| 8 | B | | | $CH_2CH_3$ | $R^{10} = CF_3$  $R^9 = R^{12} = H$<br>$R^{11} = N(CH_2CH_3)_2$ | OH | Zn |
| 9 | A | $CH_2CH_3$ | $R^2 = R^3 = CN$ | | $R^6 = CF_3$  $R^5 = R^8 = H$<br>$R^7 = N(CH_2CH_3)[(CH_2)_3CH_3]$ | OH | Fe |
| 10 | B | | | $CH_2CH_3$ | $R^{10} = CF_3$  $R^9 = R^{12} = H$<br>$R^{11} = N(CH_2CH_3)[(CH_2)_3CH_3]$ | OH | Fe |
| 11 | A | $CH_2CH_3$ | $R^2 = R^3 = CN$ | | $R^6 = OCH_3$  $R^5 = R^8 = H$<br>$R^7 = N(CH_2CH_3)[(CH_2)_3CH_3]$ | OH | Cr |
| 12 | B | | | $CH_2CH_3$ | $R^{10} = OCH_3$  $R^9 = R^{12} = H$<br>$R^{11} = N(CH_2CH_3)[(CH_2)_3CH_3]$ | OH | Cr |
| 13 | A | H | $R^2 = R^3 = NO_2$ | | $R^6 = OH$  $R^5 = R^9 = H$<br>$R^7 = N[(CH_2)_3CH_3]_2$ | OH | Ru |
| 14 | B | | | H | $R^{10} = OH$  $R^9 = R^{12} = H$<br>$R^{11} = N[(CH_2)_3CH_3]_2$ | OH | Ru |
| 15 | A | H | $R^2 = R^3 = NO_2$ | | $R^5 = OH$  $R^6 = R^8 = H$<br>$R^7 = N][(CH_2)_3CH_3]_2$ | OH | Rh |
| 16 | B | | | H | $R^9 = OH$  $R^{10} = R^{12} = H$<br>$R^{11} = N(CH_2CH_3)[(CH_2)_3CH_3]$ | OH | Rh |
| 17 | A | H | $R^2 = R^3 = NO_2$ | | $R^5 = O(CH_2)_3CH_3$  $R^6 = R^8 = H$<br>$R^7 = N(CH_2CH_3)[(CH_2)_3CH_3]$ | OH | Pd |
| 18 | B | | | H | $R^9 = O(CH_2)_3CH_3$  $R^{10} = R^{12} = H$<br>$R^{11} = N(CH_2CH_3)[(CH_2)_3CH_3]$ | OH | Pd |
| 19 | A | $CH_2CH_3$ | $R2 = R^3 = CH_2CH_3$ | | $R^5 = C(CH_3)_3$  $R^6 = R^8 = H$<br>$R^7 = N[(CH_2)_5CH_3]_2$ | $CONH_2$ | Ag |
| 20 | B | | | $CH_2CH_3$ | $R^9 = C(CH_3)_3$  $R^{10} = R^{12} = H$<br>$R^{11} = N[(CH_2)_5CH_3]_2$ | $CONH_2$ | Ag |
| 21 | A | $(CH_2)_2CH_3$ | $R^2 = R^3 = (CH_2)_2CH_3$ | | $R^5 = C(CH_3)_3$  $R^6 = R^8 = H$<br>$R^7 = N[(CH_2)_7CH_3]_2$ | $CONH_2$ | Cd |
| 22 | B | | | $(CH_2)_2CH_3$ | $R^9 = C(CH_3)_3$  $R^{10} = R^{12} = H$<br>$R^{11} = N[(CH_2)_7CH_3]_2$ | $CONH_2$ | Cd |
| 23 | A | $(CH_2)_3CH_3$ | $R^2 = R^3 = (CH_2)_3CH_3$ | | $R^5 = (CH_2)_2CH(CH_3)_2$  $R^6 = R^8 = H$<br>$R^7 = N[(CH_2)_9CH_3]_2$ | $CONH_2$ | Pt |
| 24 | B | | | $(CH_2)_3CH_3$ | $R^9 = (CH_2)_2CH(CH_3)_2$  $R^{10} = R^{12} = H$<br>$R^{11} = N[(CH_2)_9CH_3]_2$ | $CONH_2$ | Pt |
| 25 | A | $CH_3$ | $R^2 = (CH_2)_3CH_3$ | | $R^6 = OCH_2CH_3$  $R^5 = R^8 = H$<br>$R^7 = N(CH_3)[(CH_2)_3CH_3]$ | COOH | Ni |
| 26 | B | | | $CH_3$ | $R^{10} = OCH_2CH_3$  $R^9 = R^{12} = H$<br>$R^{11} = N(CH_3)[(CH_2)_3CH_3]$ | COOH | Ni |
| 27 | A | $CH_3$ | $R^3 = (CH_2)_3CH_3$ | | $R^6 = OCH_2CH_3$  $R^6 = R^8 = H$<br>$R^7 = N(CH_3)[(CH_2)_5CH_3]$ | COOH | Co |
| 28 | B | | | $CH_3$ | $R^{10} = OCH_2CH_3$  $R^9 = R^{12} = H$<br>$R^{11} = N(CH_3)[(CH_2)_5CH_3]$ | COOH | Co |
| 29 | A | $CH_3$ | $R^2 = NO_2$ | | $R^6 = OCH_2CH_3$  $R^5 = R^8 = H$<br>$R^7 = N(CH_2CH_3)[(CH_2)_3CH_3]$ | COOH | Cu |
| 30 | B | | | $CH_3$ | $R^{10} = OCH_2CH_3$  $R^9 = R^{12} = H$<br>$R^{11} = N(CH_2CH_3)[(CH_2)_3CH_3]$ | COOH | Cu |

TABLE 1-continued

| Compound No. | Structure | $R^1$ | $R^2, R^3$ | $R^4$ | Structure: A: $R^5$–$R^8$<br>Structure B: $R^9$–$R^{12}$ | X | Metal |
|---|---|---|---|---|---|---|---|
| 31 | A | $CH_3$ | $R^3 = NO_2$ | | $R^6 = OCH_2CH_3$ $R^5 = R^8 = H$<br>$R^7 = N(CH_2CH_3)[(CH_2)_5CH_3]$ | COOH | Fe |
| 32 | B | | | $CH_3$ | $R^{10} = OCH_2CH_3$ $R^9 = R^{12} = H$<br>$R^{11} = N(CH_2CH_3)[(CH_2)_5CH_3]$ | COOH | Fe |
| 33 | A | H | $R^2 = R^3 = NO_2$ | | $R^6 = NO_2$ $R^5 = R^8 = H$<br>$R^7 = N[(CH_2)_5CH_3]_2$ | COOH | Zn |
| 34 | B | | | H | $R^9 = NO_2$ $R^{10} = R^{12} = H$<br>$R^{11} = N[(CH_2)_5CH_3]_2$ | COOH | Zn |
| 35 | A | $CH_3$ | $R^2 = CN$ | | $R^5 = NO_2$ $R^6 = R^8 = H$<br>$R^7 = N[(CH_2)_7CH_3]_2$ | COOH | Cr |
| 36 | B | | | $CH_3$ | $R^9 NO_2$ $R^{10} = R^{12} = H$<br>$R^{11} = N[(CH_2)_7CH_3]_2$ | COOH | Cr |
| 37 | A | $CH_2CH_3$ | $R^2 = CN$ | | $R^5 = NO_2$ $R^6 = R^8 = H$<br>$R^7 = N[(CH_2)_3CH_3]_2$ | OH | Fe |
| 38 | B | | | $CH_2CH_3$ | $R^9 = NO_2$ $R^{10} = R^{12} = H$<br>$R^{11} = N[(CH_2)_3CH_3]_2$ | OH | Fe |
| 39 | A | H | | | $R^5 = CH_2CH_3$ $R^8 = H$<br>$R^6 = O(CH_2)_3 CH_3$<br>$R^7 = N[(CH_2)_3CH_3]_2$ | OH | Ru |
| 40 | B | | | H | $R^9 = CH_2CH_3$ $R^{12} = H$<br>$R^{10} = O(CH_2)_3CH_3$<br>$R^{11} = N[(CH_2)_3CH_3]2$ | OH | Ru |
| 41 | A | $CH_3$ | | | $R^5 = CH_2CH_3$ $R^8 = H$<br>$R^6 = O(CH_2)_3CH_3$<br>$R^7 = N[(CH_2)_3CH_3]_2$ | OH | Os |
| 42 | B | | | $CH_3$ | $R^9 = CH_2CH_3$ $R^{12} = H$<br>$R^{10} = O(CH_2)_3CH_3$<br>$R^{11} = N[(CH_2)_3CH_3]_2$ | OH | Os |
| 43 | A | $CH_2CH_3$ | | | $R^5 = CH_2CH_3$ $R^9 = H$<br>$R^6 = O(CH_2)_3CH_3$<br>$R^7 = N[(CH_2)_3CH_3]_2$ | OH | Au |
| 44 | B | | | $CH_2CH_3$ | $R^9 = CH_2CH_3$ $R^{12} = H$<br>$R^{10} = O(CH_2)_3CH_3$<br>$R^{11} = N[(CH_2)_3]_2$ | OH | Au |
| 45 | A | $CH_3$ | $R^2 = R^3 = H$ | | $R^5 = CH_3$ $R^8 = H$<br>$R^6 = OCH_3$<br>$R^7 N[(CH_2)_5CH_3]_2$ | COOH | Ni |
| 46 | B | | | $CH_3$ | $R^9 = CH_3$ $R^{12} = H$<br>$R^{10} = OCH_3$<br>$R^{11} = N[(CH_2)_5CH_3]_2$ | COOH | Ni |
| 47 | A | $CH_3$ | $R^2 = R^3 = CN$ | | $R^5 = CH_3$ $R^8 = H$<br>$R^6 = OCH_3$<br>$R^7 = N[(CH_2)_5CH_3]_2$ | COOH | Co |
| 48 | B | | | $CH_3$ | $R^9 = CH_3$ $R^{12} = H$<br>$R^{10} = OCH_3$<br>$R^{11} = N[(CH_2)_5C_3]_2$ | COOH | Co |
| 49 | A | $CH_3$ | $R^2 = R^3 = CN$ | | $R^5 = CH_3$ $R^8 = H$<br>$R^6 = OCH_3$<br>$R^7 = N[(CH_2)_5CH_3]2$ | OH | Cu |
| 50 | B | | | $CH_3$ | $R^9 = CH_3$ $R^{12} = H$<br>$R^{10} = OCH_3$<br>$R^{11} = N[(CH_2)_5CH_3]_2$ | OH | Cu |

Other features of this invention will become apparent in the course of the following description of exemplary embodiments, which are given for illustration of the invention and are not intended to be limiting thereof.

EXAMPLE 1

Fabrication of Optical Recording Medium No. 1

A guide groove with a depth of 1200 Å, a half width of 0.4 μm and a track pitch of 1.4 μm was formed on a photopolymer provided on a polymethyl methacrylate (PMMA) substrate with a thickness of 1.2 mm.

A chloroform solution of azo metal chelate compound No. 1 shown in TABLE 1 was applied to the above prepared substrate by spinner coating, whereby a recording layer with a thickness of 800 Å was provided on the substrate.

Thus, an optical recording medium No. 1 according to the present invention was fabricated.

EXAMPLES 2 TO 15

Fabrication of Optical Recording Media Nos. 2 to 15

The procedure for fabrication of the optical recording medium No. 1 in Example 1 was repeated except that the azo metal chelate compound No. 1 for use in the recording layer coating liquid in Example 1 was replaced by azo metal chelate compounds No. 2 to No. 15 shown in TABLE 1, respectively in. Examples 2 to 15.

Thus, optical recording media Nos. 2 to 15 according to the present invention were fabricated.

Comparative Example 1

Fabrication of Comparative Optical Recording Medium No. 1

The procedure for fabrication of the optical recording medium No. 1 in Example 1 was repeated except that the azo metal chelate compound No. 1 for use in the recording layer coating liquid in Example 1 was replaced by a compound represented by the following formula (a):

(a)

Thus, a comparative optical recording medium No. 1 was fabricated.

To evaluate the recording characteristics of each of the above prepared optical recording media Nos. 1 to 15 according to the present invention and comparative optical recording medium No. 1, information was recorded by applying a laser beam with a wavelength of 635 nm to the substrate side of each recording medium, under the conditions that the recording frequency was 1.25 MHz, and the recording linear speed was 1.2 m/sec.

Using the same laser as employed in the above, a continuous wave laser beam having a reproduction power of 0.25 to 0.3 mW was applied to each recording medium to reproduce the recorded information, and the light reflected from the recording medium was detected. The detected light was subjected to a spectral analysis, using a scanning filter at a band width of 30 kHz, so that the initial C/N (carrier/noise) ratio was obtained.

Further, the reflectance (initial value) of a non-recorded portion on the guide groove was also measured by using the same laser beams.

The results are shown in TABLE 2.

Light Resistance Test

Each recording medium was caused to deteriorate by being continuously exposed to the light of a xenon lamp of 40,000 lux for 50 hours. After the exposure, the reflectance and the C/N ratio of each recording medium were measured in the same manner as in the above. The results are also shown in TABLE 2.

Preservation Stability Test

Each recording medium was caused to deteriorate by allowing it to stand at 85° C. and 85% RH for 720 hours, and then the reflectance and the C/N ratio of each recording medium were measured in the same manner as in the above. The results are also shown in TABLE 2.

TABLE 2

|  | Initial Stage | | After Light Resistance Test | | After Preservation Stability Test | |
| --- | --- | --- | --- | --- | --- | --- |
|  | Reflectance (%) | C/N ratio (dB) | Reflectance (%) | C/N ratio (dB) | Reflectance (%) | C/N ratio (dB) |
| Ex. 1 | 25 | 50 | 21 | 45 | 24 | 47 |
| Ex. 2 | 27 | 51 | 23 | 47 | 25 | 46 |
| Ex. 3 | 25 | 51 | 22 | 46 | 24 | 48 |
| Ex. 4 | 24 | 50 | 22 | 46 | 23 | 47 |
| Ex. 5 | 25 | 51 | 22 | 46 | 24 | 48 |
| Ex. 6 | 26 | 51 | 24 | 47 | 25 | 48 |
| Ex. 7 | 25 | 52 | 22 | 45 | 23 | 48 |
| Ex. 8 | 25 | 52 | 23 | 46 | 23 | 50 |

TABLE 2-continued

|  | Initial Stage | | After Light Resistance Test | | After Preservation Stability Test | |
| --- | --- | --- | --- | --- | --- | --- |
|  | Reflectance (%) | C/N ratio (dB) | Reflectance (%) | C/N ratio (dB) | Reflectance (%) | C/N ratio (dB) |
| Ex. 9 | 22 | 53 | 20 | 49 | 21 | 52 |
| Ex. 10 | 24 | 53 | 21 | 49 | 22 | 51 |
| Ex. 11 | 23 | 51 | 21 | 48 | 20 | 49 |
| EX. 12 | 23 | 50 | 20 | 48 | 21 | 48 |
| Ex. 13 | 24 | 51 | 21 | 47 | 22 | 50 |
| Ex. 14 | 26 | 53 | 24 | 50 | 25 | 52 |
| Ex. 15 | 26 | 51 | 24 | 49 | 25 | 51 |
| Comp. Ex. 1 | 11 | — | 7 | — | 9 | — |

Note:
"—" denotes that the measurement was impossible.

EXAMPLE 16

Fabrication of Optical Recording Medium No. 16

A 1.2-mm-thick polycarbonate substrate bearing thereon a guide groove with a depth of 1000 Å, a half width of 0.4 μm and a track pitch of 1.6 μm was prepared by injection molding.

Azo metal chelate compound No. 16 shown in TABLE 1 was dissolved in a mixed solvent of methylcyclohexane, 2-methoxyethanol, methyl ethyl ketone and tetrahydrofuran, and the thus obtained solution of compound No. 16 was applied to the above-mentioned polycarbonate substrate by spinner coating, whereby a recording layer with a thickness of 1800 Å was provided on the substrate.

On the thus provided recording layer, a reflection layer of gold with a thickness of 2000 Å was provided by sputtering.

A protective layer made of an acrylic photopolymer with a thickness of 5 μm was formed on the reflection layer.

Thus, an optical recording medium No. 16 according to the present invention was fabricated.

EXAMPLES 17 TO 30

Fabrication of Optical Recording Media Nos. 17 to 30

The procedure for fabrication of the optical recording medium No. 16 in Example 16 was repeated except that azo metal chelate compound No. 16 for use in the recording layer coating liquid in Example 16 was replaced by azo metal chelate compounds No. 17 to No. 30 shown in TABLE 1, respectively in Examples 17 to 30.

Thus, optical recording media Nos. 17 to 30 according to the present invention were fabricated.

Comparative Example 2

Fabrication of Comparative Optical Recording Medium No. 2

The procedure for fabrication of the optical recording medium No. 16 in Example 16 was repeated except that the azo metal chelate compound No. 16 for use in the recording layer coating liquid in Example 16 was replaced by a compound represented by the following formula (a):

(a)

Thus, a comparative optical recording medium No. 2 was fabricated.

To evaluate the recording characteristics of each of the above prepared optical recording media Nos. 16 to 30 according to the present invention and comparative optical recording medium No. 2, EFM signals were recorded in each recording medium by applying thereto a semiconductor laser beam with a wavelength of 635 nm and a beam diameter of 1.4 $\mu$m, while tracking was conducted, under the condition that the recording linear speed was set at 1.4 m/sec. Then, the recorded EFM signals were reproduced in such a manner that the recording medium was irradiated by a continuous wave of the same laser as employed in the above. Thus, the reproduction waveform obtained from each recording medium was inspected.

Further, the reflectance (initial value) of a non-recorded portion on the guide groove was also measured by using the same laser beams.

The results are shown in TABLE 3.

Light Resistance Test

Each recording medium was caused to deteriorate by being continuously exposed to the light of a xenon lamp of 40,000 lux for 50 hours. After the exposure, the reproduction waveform obtained from each recording medium was inspected in the same manner as mentioned above. Furthermore, the reflectance of each recording medium was measured in the same manner as mentioned above.

The results are also shown in TABLE 3.

TABLE 3

| Example No. | Compound No. | Initial Stage | | After Light Resistance Test | |
|---|---|---|---|---|---|
| | | Reflectance (%) | Reproduction Waveform | Reflectance (%) | Reproduction Waveform |
| 16 | 16 | 70 | ○ | 68 | ○ |
| 17 | 17 | 72 | ○ | 70 | ○ |
| 18 | 18 | 69 | ○ | 67 | ○ |
| 19 | 19 | 70 | ○ | 69 | ○ |
| 20 | 20 | 66 | ○ | 64 | ○ |
| 21 | 21 | 72 | ○ | 70 | ○ |
| 22 | 22 | 68 | ○ | 65 | ○ |
| 23 | 23 | 67 | ○ | 64 | ○ |
| 24 | 24 | 68 | ○ | 65 | ○ |
| 25 | 25 | 70 | ○ | 68 | ○ |
| 26 | 26 | 67 | ○ | 64 | ○ |
| 27 | 27 | 70 | ○ | 68 | ○ |
| 28 | 28 | 68 | ○ | 66 | ○ |
| 29 | 29 | 65 | ○ | 62 | ○ |
| 30 | 30 | 64 | ○ | 60 | ○ |
| Comp. Ex. 2 | (a) | 5 | — | 5 | — |

Note:
"○" denotes that the reproduction waveform was clear.
"—" denotes that the measurement was impossible.

EXAMPLE 31

Fabrication of Optical Recording Medium No. 31

A 1.2-mm-thick polycarbonate substrate bearing thereon a guide groove with a depth of 1000 Å, a half width of 0.45 $\mu$m and a track pitch of 1.6 $\mu$m was prepared by injection molding.

A mixture of one part by weight of azo metal chelate compound No. 31 shown in TABLE 1 and one part by weight of a compound of the following formula (b) was dissolved in a mixed solvent of methylcyclohexane, 2-methoxyethanol, methyl ethyl ketone and tetrahydrofuran, and the thus obtained solution was applied to the above-mentioned polycarbonate substrate by spinner coating, whereby a recording layer with a thickness of 1700 Å was provided on the substrate:

(b)

On the thus provided recording layer, a reflection layer of gold with a thickness of 2000 Å was provided by sputtering.

A protective layer made of an acrylic photopolymer with a thickness of 5 $\mu$m was then formed on the reflection layer.

Thus, an optical recording medium No. 31 according to the present invention was fabricated.

EXAMPLES 32 TO 37

Fabrication of Optical Recording Media Nos. 32 to 37

The procedure for fabrication of the optical recording medium No. 31 in Example 31 was repeated except that the azo metal chelate compound No. 31 for use in the recording layer coating liquid in Example 31 was replaced by azo metal chelate compounds No. 32 to No. 37 shown in TABLE 1, respectively in Examples 32 to 37.

Thus, optical recording media Nos. 32 to 37 according to the present invention were fabricated.

EXAMPLES 38 to 44

Fabrication of Optical Recording Media Nos. 38 to 44

The procedure for fabrication of the optical recording medium No. 31 in Example 31 was repeated except that the compound of formula (b) for use in the recording layer coating liquid in Example 31 was replaced by a compound of the following formula (c) and that the azo metal chelate compound No. 31 for use in the recording layer coating liquid in Example 31 was replaced by azo metal chelate compounds No. 38 to No. 44 shown in TABLE 1, respectively in Examples 38 to 44.

Thus, optical recording media Nos. 38 to 44 according to the present invention were fabricated.

EXAMPLES 45 to 50

Fabrication of Optical Recording Media Nos. 45 to 50

The procedure for fabrication of the optical recording medium No. 31 in Example 31 was repeated except that the compound of formula (b) for use in the recording layer coating liquid in Example 31 was replaced by a compound of the following formula (d) and that the azo metal chelate compound No. 31 for use in the recording layer coating liquid in Example 31 was replaced by azo metal chelate compounds No. 45 to No. 50 shown in TABLE 1, respectively in Examples 45 to 50.

Thus, optical recording media Nos. 45 to 50 according to the present invention were fabricated.

Comparative Example 3

Fabrication of Comparative Optical Recording Medium No. 3

The procedure for fabrication of the optical recording medium No. 31 in Example 31 was repeated except that the azo metal chelate compound No. 31 for use in the recording layer coating liquid in Example 31 was removed from the formulation for the recording layer coating liquid.

Thus, a comparative optical recording medium No. 3 was fabricated.

Comparative Example 4

Fabrication of Comparative Optical Recording Medium No. 4

The procedure for fabrication of the optical recording medium No. 38 in Example 38 was repeated except that the azo metal chelate compound No. 38 for use in the recording layer coating liquid in Example 38 was removed from the formulation for the recording layer coating liquid.

Thus, a comparative optical recording medium No. 4 was fabricated.

Comparative Example 5

Fabrication of Comparative Optical Recording Medium No. 5

The procedure for fabrication of the optical recording medium No. 45 in Example 45 was repeated except that the azo metal chelate compound No. 45 for use in the recording layer coating liquid in Example 45 was removed from the formulation for the recording layer coating liquid.

Thus, a comparative optical recording medium No. 5 was fabricated.

To evaluate the recording characteristics of each of the above prepared optical recording media Nos. 31 to 50 according to the present invention and comparative optical recording media Nos. 3 to 5, EFM signals were recorded in each recording medium by applying thereto a semiconductor laser beam with a wavelength of 780 nm and a beam diameter of 1.6 μm, while tracking was conducted, under the condition that the recording linear speed was set at 1.4 m/sec. Then, the recorded EFM signals were reproduced in such a manner that the recording medium was irradiated by the same semiconductor laser beam as employed in the above. In addition, the recorded EFM signals were also reproduced by applying a continuous wave semiconductor laser beam with a wavelength of 635 nm and a beam diameter of 1.4 μm to each recording medium. Thus, the two reproduction waveforms obtained from each recording medium were inspected.

Further, the reflectance (initial value) of a non-recorded portion on the guide groove was also measured by using the respective laser beams.

The results are shown in TABLE 4.

TABLE 4

| | 780 nm | | 680 nm | |
|---|---|---|---|---|
| Example No. | Reflectance (%) | Reproduction Waveform | Reflectance (%) | Reproduction Waveform |
| 31 | 69 | ○ | 21 | ○ |
| 32 | 71 | ○ | 22 | ○ |
| 33 | 72 | ○ | 21 | ○ |
| 34 | 70 | ○ | 23 | ○ |
| 35 | 70 | ○ | 22 | ○ |
| 36 | 73 | ○ | 21 | ○ |
| 37 | 72 | ○ | 23 | ○ |
| 38 | 68 | ○ | 20 | ○ |
| 39 | 70 | ○ | 19 | ○ |
| 40 | 72 | ○ | 22 | ○ |
| 41 | 69 | ○ | 21 | ○ |
| 42 | 71 | ○ | 23 | ○ |
| 43 | 70 | ○ | 22 | ○ |

TABLE 4-continued

| | 780 nm | | 680 nm | |
|---|---|---|---|---|
| Example No. | Reflectance (%) | Reproduction Waveform | Reflectance (%) | Reproduction Waveform |
| 44 | 71 | ◯ | 19 | ◯ |
| 45 | 71 | ◯ | 20 | ◯ |
| 46 | 68 | ◯ | 21 | ◯ |
| 47 | 69 | ◯ | 21 | ◯ |
| 48 | 68 | ◯ | 23 | ◯ |
| 49 | 67 | ◯ | 22 | ◯ |
| 50 | 70 | ◯ | 23 | ◯ |
| Comp. Ex. 3 | 75 | ◯ | 5 | — |
| Comp. Ex. 4 | 74 | ◯ | 5 | — |
| Comp. Ex. 5 | 74 | ◯ | 5 | — |

Note:
"◯" denotes that the reproduction waveform was clear.
"—" denotes that the measurement was impossible.

As previously explained, information can be recorded in the optical recording medium of the present invention, and the recorded information can be reproduced by the application of a laser beam with a wavelength of 700 nm or less.

Japanese Patent Application No. 09-111140 filed Apr. 28, 1997 is hereby incorporated by reference.

What is claimed is:

1. An optical recording medium comprising a substrate and a recording layer formed thereon comprising an azo metal chelate compound which comprises an azo moiety of formula (I) and a bivalent or trivalent metal:

(I)

wherein X is OH group, COOH group or $CONH_2$ group; Y is a residual group forming a heterocyclic ring in combination with nitrogen atoms bonded thereto; and Z is a residual group forming an aromatic ring in combination with carbon atoms bonded thereto, wherein said azo metal chelate compound exhibits a maximum absorption in a wavelength range of 450 to 630 nm.

2. The optical recording medium as claimed in claim 1, further comprising an undercoat layer which is provided between said substrate and said recording layer.

3. The optical recording medium as claimed in claim 1, further comprising a protective layer which is overlaid on said recording layer.

4. The optical recording medium as claimed in claim 1, further comprising a reflection layer which is overlaid on said recording layer.

5. The optical recording medium as claimed in claim 4, further comprising a protective layer which is overlaid on said reflection layer.

6. An optical recording medium comprising a substrate and a recording layer formed thereon comprising an azo metal chelate compound and a bivalent or trivalent metal, wherein the azo moiety of said azo metal chelate compound is represented by formula (II):

(II)

wherein $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; X is OH group, COOH group or $CONH_2$ group; and Z is a residual group forming an aromatic ring in combination with carbon atoms bonded thereto.

7. The optical recording medium as claimed in claim 6, wherein said azo moiety of said azo metal chelate compound is represented by formula (IV):

(IV)

wherein $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; $R^5$ to $R^8$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or $CONH_2$ group.

8. An optical recording medium comprising a substrate and a recording layer formed thereon comprising an azo metal chelate compound and a bivalent or trivalent metal, wherein the azo moiety of said azo metal chelate compound is represented by the formula (III):

(III)

wherein $R^4$ is a hydrogen atom or an alkyl group; X is OH group, COOH group or $CONH_2$ group; and Z is a residual group forming an aromatic ring in combination with carbon atoms bonded thereto.

9. The optical recording medium as claimed in claim 8, wherein said azo moiety of said azo metal chelate compound is represented by formula (V):

(V)

wherein $R^4$ is a hydrogen atom or an alkyl group; $R^9$ to $R^{12}$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or $CONH_2$ group.

10. An optical recording medium comprising a substrate and a recording layer formed thereon comprising an azo metal chelate compound which comprises an azo moiety of formula (I) and a bivalent or trivalent metal:

(I)

wherein X is OH group. COOH group or $CONH_2$ group; Y is a residual group forming a heterocyclic ring in combination with nitrogen atoms bonded thereto; and Z is a residual group forming an aromatic ring in combination with carbon atoms bonded thereto, wherein said recording layer further comprises a dyestuff which exhibits a maximum absorption in a wavelength range of 680 to 750 nm.

11. The optical recording medium as claimed in claim 10, wherein said dyestuff is selected from the group consisting of a cyanine compound, a phthalo-cyanine compound, a triarylmethane compound and a diarylmethane compound.

12. A method of reproducing recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound which comprises an azo moiety of formula (I) and a bivalent or trivalent metal:

(I)

wherein X is OH group, COOH group or $CONH_2$ group; Y is a residual group forming a heterocyclic ring in combination with nitrogen atoms bonded thereto; and Z is a residual group forming an aromatic ring in combination with carbon atoms bonded thereto, wherein said azo metal chelate compound for use in said optical recording medium exhibits a maximum absorption in a wavelength range of 450 to 630 nm.

13. A method of reproducing recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound and a bivalent or trivalent metal, wherein the azo moiety of said azo metal chelate compound for use in said optical recording medium is represented by the formula (II):

(II)

wherein $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; X is OH group, COOH group or $CONH_2$ group; and Z is a residual group forming an aromatic ring in combination with carbon atoms bonded thereto.

14. The reproduction method as claimed in claim 13, wherein said azo moiety of said azo metal chelate compound is represented by formula (IV):

(IV)

wherein $R^1$ is a hydrogen atom or an alkyl group; $R^2$ and $R^3$ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; $R^5$ to $R^8$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or $CONH_2$ group.

15. A method of reproducing recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound and a bivalent or trivalent metal, wherein the azo moiety of said azo metal chelate compound for use in said optical recording medium is represented by formula (III):

(III)

wherein R⁴ is a hydrogen atom or an alkyl group; X is OH group, COOH group or CONH₂ group; and Z is a residual group forming an aromatic ring in combination with carbon atoms bonded thereto.

16. The reproduction method as claimed in claim 15, wherein said azo moiety of said azo metal chelate compound is represented by formula (V):

(V)

wherein R⁴ is a hydrogen atom or an alkyl group; R⁹ to R¹² are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or CONH₂ group.

17. A method of reproducing recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound which comprises an azo moiety of formula (I) and a bivalent or trivalent metal:

(I)

wherein X is OH group, COOH group or CONH₂ group; Y is a residual group forming a heterocyclic ring in combination with nitrogen atoms bonded thereto; and Z is a residual group forming an aromatic ring in combination with carbon atoms bonded thereto,
wherein said recording layer of said optical recording medium further comprises a dyestuff which exhibits a maximum absorption in a wavelength range of 680 to 750 nm.

18. The reproduction method as claimed in claim 17, wherein said dyestuff is selected from the group consisting of a cyanine compound, a phthalocyanine compound, a triarylmethane compound and a diarylmethane compound.

19. A method of recording information and/or reproducing said recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound which comprises an azo moiety of formula (I) and a bivalent or trivalent metal:

(I)

wherein X is OH group, COOH group or CONH₂ group; Y is a residual group forming a heterocyclic ring in combination with nitrogen atoms bonded thereto; and Z is a residual group forming an aromatic ring in combination with carbon atoms bonded thereto, wherein said azo metal chelate compound exhibits a maximum absorption in a wavelength range of 450 to 630 nm.

20. A method of recording information and/or reproducing said recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound and a bivalent or trivalent metal, wherein the azo moiety of said azo metal chelate compound for use in said optical recording medium is represented by formula (II):

(II)

wherein R¹ is a hydrogen atom or an alkyl group; R² and R³ are each independently a hydrogen atom, an alkyl group which may have a substituent, an aryl group which may have a substituent, an alkenyl group which may have a substituent, a halogen atom, nitro group or cyano group, and R² and R³ may form a ring together; X is OH group, COOH group or CONH₂ group; and Z is a residual group forming an aromatic ring in combination with carbon atoms bonded thereto.

21. The recording and/or reproduction method as claimed in claim 20, wherein said azo moiety of said azo metal chelate compound is represented by formula (IV):

(IV)

wherein R¹ is a hydrogen atom or an alkyl group; R² and R³ are each independently a hydrogen atom, an alkyl group which may have a substituent, an aryl group which may have a substituent, an alkenyl group which may have a substituent, a halogen atom, nitro group or cyano group, and $R^2$ and $R^3$ may form a ring together; $R^5$ to $R^8$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or $CONH_2$ group.

22. A method of recording information and/or reproducing said recorded information, which comprises the step of applying a laser beam in a wavelength range of 620 to 690 nm to an optical recording medium which comprises a substrate, a recording layer formed thereon, and a reflection layer formed on said recording layer, said recording layer comprising an azo metal chelate compound and a bivalent or trivalent metal, wherein the azo moiety of said azo metal chelate compound for use in said optical recording medium is represented by formula (III):

(III)

wherein $R^4$ is a hydrogen atom or an alkyl group; X is OH group, COOH group or $CONH_2$ group; and Z is a residual group forming an aromatic ring in combination with carbon atoms bonded thereto.

23. The recording and/or reproduction method as claimed in claim 22, wherein said azo moiety of said azo metal chelate compound is represented by formula (V):

(V)

wherein $R^4$ is a hydrogen atom or an alkyl group; $R^9$ to $R^{12}$ are each independently a hydrogen atom, an alkyl group which may have a substituent, an aryl group which may have a substituent, an alkenyl group which may have a substituent, an alkylalkoxyl group which may have a substituent, an alkylamino group which may have a substituent, a halogen atom, nitro group, cyano group, hydroxyl group, amino group, or methyl trifluoride group; and X is OH group, COOH group or $CONH_2$ group.

24. A method of recording information and/or reproducing said information, which comprises the step of applying a laser beam in a wavelength range of 770 to 830 nm to an optical recording medium which comprises a substrate, a recording layer formed thereon, and a reflection layer formed on said recording layer, said recording layer comprising:

a dyestuff which exhibits a maximum absorption in a wavelength range of 680 to 750 nm, and an azo metal chelate compound which comprises an azo moiety of formula (I) and a bivalent or trivalent metal:

(I)

wherein X is OH group, COOH group or $CONH_2$ group; Y is a residual group forming a heterocyclic ring in combination with nitrogen atoms bonded thereto; and Z is a residual group forming an aromatic ring in combination with carbon atoms bonded thereto.

25. The recording and/or reproduction method as claimed in claim 24, wherein said dyestuff for use in said optical recording medium is selected from the group consisting of a cyanine compound, a phthalocyanine compound, a triarylmethane compound and a diarylmethane compound.

* * * * *

UNITED STATES PATENT AND TRADEMARK OFFICE
CERTIFICATE OF CORRECTION

PATENT NO. : 6,057,020

DATED : May 2, 2000

INVENTOR(S): Yasunobu UENO, et al.

It is certified that an error appears in the above-identified patent and that said Letters Patent is hereby corrected as shown below:

On the title page, item [57] Abstract, line 6, "Cooh" should read — COOH--.

Column 6, line 49, "2-methylbutyi" should read --2-methylbutyl--.

Column 7, line 3, "butyi" should read, --butyl--.

Column 8, line 35, "spray coating" should read --spray coating,--.

Column 12, Table 1, Compound 7, "$R^6=CF_3\ R^5=R^{12}=H$"
should read --$R^6=CF_3\ R^5=R^8=H$--.

Column 14, Table 1, Compound 33, "$R^6=NO_2\ R^6=R^8=H$"
should read --$R^5=NO_2\ R^6=R^8=H$--.

Column 14, line 59, "in." should read --in--.

Column 15, line 61, "46" should read --48--.

Column 23, line 35, "group." should read --group,--.

Signed and Sealed this

Eighth Day of May, 2001

*Attest:*

NICHOLAS P. GODICI

*Attesting Officer*    *Acting Director of the United States Patent and Trademark Office*